US010127296B2

(12) United States Patent
Rangarajan et al.

(10) Patent No.: US 10,127,296 B2
(45) Date of Patent: Nov. 13, 2018

(54) COOPERATIVE NAMING FOR CONFIGURATION ITEMS IN A DISTRIBUTED CONFIGURATION MANAGEMENT DATABASE ENVIRONMENT

(75) Inventors: Govindarajan Rangarajan, Sunnyvale, CA (US); Ajoy Kumar, Pune (IN); Narayan Kumar, San Ramon, CA (US); Douglas Mueller, Palo Alto, CA (US); Matthew Conners, Half Moon Bay, CA (US); Darius Wallace, San Jose, CA (US)

(73) Assignee: BMC Software, Inc., Houston, TX (US)

(*) Notice: Subject to any disclaimer, the term of this patent is extended or adjusted under 35 U.S.C. 154(b) by 6 days.

(21) Appl. No.: 13/082,194

(22) Filed: Apr. 7, 2011

(65) Prior Publication Data

US 2012/0259812 A1 Oct. 11, 2012

(51) Int. Cl.
*G06F 17/30* (2006.01)
(52) U.S. Cl.
CPC .............................. *G06F 17/30575* (2013.01)
(58) Field of Classification Search
CPC ................................................. G06F 17/30575
USPC ......................................................... 707/620
See application file for complete search history.

(56) References Cited

U.S. PATENT DOCUMENTS

| 5,761,505 A | 6/1998 | Golson |
| 5,948,055 A | 9/1999 | Pulsipher et al. |
| 5,991,877 A | 11/1999 | Luckenbaugh |
| 6,041,058 A | 3/2000 | Flanders et al. |
| 6,212,266 B1 | 4/2001 | Busuioc |
| 6,266,513 B1 | 7/2001 | Briancon |
| 6,286,047 B1 | 9/2001 | Ramanathan et al. |
| 6,336,138 B1 | 1/2002 | Caswell et al. |
| 6,496,838 B1 | 12/2002 | Zamora-Mckelvy et al. |
| 6,820,090 B2 | 11/2004 | Chambers |
| 6,836,798 B1 | 12/2004 | Adams |

(Continued)

OTHER PUBLICATIONS

"BMC Atrium Core 7.6.00; Normalization and Reconciliation Guide", Sep. 2009, 1-148 pages.

(Continued)

*Primary Examiner* — Syling Yen
(74) *Attorney, Agent, or Firm* — Brake Hughes Bellermann LLP

(57) ABSTRACT

Disclosed are methods and systems to provide coordinated identification of data items across a plurality of distributed data storage repositories (datastores). In one disclosed embodiment, a single configuration management database (CMDB) controls identification rights for all CIs as they are first identified in a master/slave relationship with all other CMDBs in the distributed environment. In a second embodiment, a plurality of CMDBs divide identification rights based upon coordination identification rules where certain CMDBs are assigned authoritative identification rights for CIs matching the rules of a particular CMDB in the distributed environment. In a third embodiment, one or more of the plurality of CMDBs may also have advisory identification rights for CIs which do not already have an identifiable unique identity and can coordinate with an authoritative CMDB to establish an identity for CIs.

12 Claims, 6 Drawing Sheets

(56) References Cited

U.S. PATENT DOCUMENTS

| | | |
|---|---|---|
| 7,003,402 B2 | 2/2006 | Christie |
| 7,082,426 B2 | 7/2006 | Musgrove et al. |
| 7,146,380 B2 | 12/2006 | Schaepe et al. |
| 7,155,427 B1 | 12/2006 | Prothia et al. |
| 7,380,025 B1 | 5/2008 | Riggins et al. |
| 7,395,256 B2 | 7/2008 | Ji et al. |
| 8,683,032 B2 | 3/2014 | Spinelli et al. |
| 8,712,979 B2 | 4/2014 | Morozov et al. |
| 9,137,115 B2 | 9/2015 | Mayfield et al. |
| 9,323,801 B2 | 4/2016 | Morozov et al. |
| 2002/0002555 A1 | 1/2002 | Wolman |
| 2002/0009085 A1 | 1/2002 | Barkai et al. |
| 2002/0143935 A1 | 10/2002 | Schenkel et al. |
| 2002/0184529 A1 | 12/2002 | Foster et al. |
| 2003/0058813 A1* | 3/2003 | Viola et al. .................. 370/328 |
| 2003/0126108 A1 | 7/2003 | Martino |
| 2004/0019672 A1 | 1/2004 | Das |
| 2004/0025157 A1 | 2/2004 | Blight et al. |
| 2004/0143600 A1 | 7/2004 | Musgrove |
| 2004/0146008 A1 | 7/2004 | Conradt et al. |
| 2004/0220963 A1 | 11/2004 | Zheng |
| 2004/0264435 A1* | 12/2004 | Chari et al. .................. 370/351 |
| 2005/0038889 A1 | 2/2005 | Frietsch |
| 2005/0080613 A1 | 4/2005 | Colledge |
| 2005/0111362 A1 | 5/2005 | Freytsis et al. |
| 2005/0216433 A1 | 9/2005 | Bland |
| 2005/0234973 A1 | 10/2005 | Zeng |
| 2006/0059253 A1 | 3/2006 | Goodman et al. |
| 2006/0064481 A1 | 3/2006 | Baron et al. |
| 2006/0069801 A1 | 3/2006 | Rich et al. |
| 2006/0080656 A1* | 4/2006 | Cain et al. .................. 717/174 |
| 2006/0106590 A1 | 5/2006 | Tseng et al. |
| 2006/0123104 A1 | 6/2006 | Spinelli et al. |
| 2006/0123393 A1 | 6/2006 | Atkins et al. |
| 2006/0136585 A1 | 6/2006 | Mayfield et al. |
| 2006/0178954 A1* | 8/2006 | Thukral et al. ............... 705/28 |
| 2006/0179124 A1 | 8/2006 | Stefaniak et al. |
| 2006/0271341 A1 | 11/2006 | Brown et al. |
| 2007/0097959 A1* | 5/2007 | Taylor .................. G06F 21/10 370/352 |
| 2007/0239700 A1* | 10/2007 | Ramachandran ............... 707/5 |
| 2008/0021917 A1 | 1/2008 | Baker et al. |
| 2008/0183724 A1 | 7/2008 | Mueller |
| 2008/0301081 A1 | 12/2008 | Karnik et al. |
| 2009/0094462 A1* | 4/2009 | Madduri .................. 713/182 |
| 2009/0319932 A1 | 12/2009 | Robinson et al. |
| 2010/0161577 A1 | 6/2010 | Morozov |
| 2011/0238637 A1 | 9/2011 | Morozov et al. |
| 2012/0259812 A1 | 10/2012 | Rangarajan et al. |
| 2013/0124681 A1* | 5/2013 | Rudenko ............... G06Q 50/10 709/217 |
| 2014/0143416 A1 | 5/2014 | Spinelli et al. |
| 2014/0195504 A1 | 7/2014 | Morozov et al. |
| 2015/0381419 A1 | 12/2015 | Kumar et al. |

OTHER PUBLICATIONS

"BMC Atrium Core 7.6.00; User's Guide", Sep. 2009, 1-78 pages.
"European Search Report dated Apr. 3, 2006 (05257482.9)".
"The Four Challenges of Customer-Centric Data Warehousing" Carleton Corporation. Nov. 1998. Nov. 1998, 16 pages.
"BMC Atrium Core 7.6.00; Concepts and Planning Guide", Sep. 2009, 1-164 pages.
Office Action mailed for U.S. Appl. No. 11/295,363, dated Apr. 3, 2013, 23 pages.
Advisory Action received for U.S. Appl. No. 11/204,189, dated May 4, 2010, 3 pages.
Final Office Action received for U.S. Appl. No. 11/204,189, dated Feb. 22, 2010, 11 pages.
Final Office Action Response filed for U.S. Appl. No. 11/295,363, filed Jan. 18, 2013, 14 pages.
Advisory Action received for U.S. Appl. No. 12/860,334, dated Nov. 29, 2012, 3 pages.
Notice of Allowance for U.S. Appl. No. 11/295,363, dated Nov. 4, 2013, 23 pages.
Notice of Allowance for U.S. Appl. No. 12/860,334, dated Dec. 17, 2013, 13 pages.
European Search Report for European Patent Application No. 05257483.7, dated Mar. 31, 2006, 7 pages.
Response to Patent Board's Decision and Final Office Action for U.S. Appl. No. 11/204,189, filed Mar. 26, 2014, 10 pages.
Non-Final Office Action for U.S. Appl. No. 11/204,189, dated Dec. 8, 2014, 9 pages.
Notice of Allowance received for U.S. Appl. No. 11/204,189, dated May 8, 2015, 7 pages.
Non-Final Office Action received for U.S. Appl. No. 14/204,437, dated May 21, 2015, 13 pages.
Restriction Requirement for U.S. Appl. No. 14/164,524, dated Oct. 30, 2015, 7 pages.
Notice of Allowance for U.S. Appl. No. 14/204,437, dated Dec. 21, 2015, 7 pages.
Non-Final Office Action for U.S. Appl. No. 14/164,524, dated Jan. 1, 2016, 13 Pages.

* cited by examiner

COOPERATIVE NAMING FOR CONFIGURATION ITEMS IN A DISTRIBUTED CONFIGURATION MANAGEMENT DATABASE ENVIRONMENT

CROSS-REFERENCE TO RELATED APPLICATIONS

This application pertains to subject matter that is related to the subject matter described in commonly owned U.S. patent application Ser. No. 11/204,189 filed on 15 Aug. 2005 entitled "A System and Method for Resource Reconciliation in an Enterprise System" by Richard Mayfield et al., which is hereby incorporated by reference in its entirety.

BACKGROUND

This disclosure relates generally to the field of distributed datastores and a cooperative identification methodology for physical and logical items which may have an associated information record in more than one of the distributed repositories. Because an item might have properties distributed across datastores, a unique identifier could help programmers and users of the distributed datastore coordinate maintenance of the data associated with the item. In the context of this disclosure, the item will be referred to as a Configuration Item or (CI) as used in the context of a system enterprise management system. However, this is only for clarity of explanation and not intended to limit the scope of this disclosure to only CIs and CMDBs (explained below). Any type of distributed datastore could benefit from concepts disclosed herein.

In one embodiment, this disclosure relates to coordinated identification of Configuration Items (CIs) across a plurality of distributed datastores known as Configuration Management Databases (CMDBs). CMDBs are ITIL®-based (Information Technology Infrastructure Library) datastores. (ITIL is a registered trademark of The Lords Commissioners of Her Majesty's Treasury acting through The Office of Government Commerce and Central Computer and Telecommunications Agency, United Kingdom.) One example of a distributed datastore is a collection of distributed (and also possibly federated) CMDBs. ITIL-based CMDBs are emerging as a prominent technology for Enterprise Management Software.

The usefulness of distributed datastores, in particular distributed CMDBs, is dependent on the quality, reliability and security of the data stored in them. A CMDB often contains data about managed resources known as Configuration Items (CIs). ITIL version 3 defines a CI as: "Any Component that needs to be managed in order to deliver an IT Service. Information about each CI is recorded in a Configuration Record within the Configuration Management System and is maintained throughout its Lifecycle by Configuration Management. CIs are under the control of Change Management. CIs typically include IT Services, hardware, software, buildings, people, and formal documentation such as Process documentation and [Service Level Agreements]." Each of these groups of CIs is also typically broken down into specific "classes" of CIs. Typical classes include, but are not limited to, Computer, Hardware, Network, Software, and Location (e.g., physical such as a room, logical such as a domain, or geographical such as a city). Each of these classes can be further broken down into subclasses or other groupings (e.g., based on implementation specifics). For example, the Computer class may be divided into the following four distinct groups: laptop computer, desktop computer, server computer, and mainframe.

The CMDB serves as a point of integration between various IT management processes. For a variety of reasons there may be more than one CMDB present in a customer environment (i.e., distributed CMDBs). Also, data from multiple sources often needs to be managed directly or by reference in commercial CMDBs. Thus, there was a need to create a standard for federating the data from various CMDBs into a single view that appears seamless and integrated to the end user. This standard, known as the CMDB Federation, or CMDBf, Standard was recently adopted by the Distributed Management Task Force (DMTF) as Document Number DSP0252.

Some of the goals of CMDBf include: enabling a variety of data consumers to access a federation of management data through a standard access interface; enabling a variety of data providers to participate in a federation of management data through a standard provider interface; and providing an approach for reconciling and combining different information about the same resources.

Because a given instance of an item (e.g., CI) being tracked via a distributed datastore may exist in a plurality of datastore storage repositories (datastores) a coordinated identification system for the item across the plurality of datastores would be desirable. In an enterprise management situation, a CI may be available across a plurality of CMDBs. Accordingly, a coordinated and authoritative identification of CIs amongst a group of CMDBs operating together would be beneficial. This disclosure presents solutions for this and other related problems.

DETAILED DESCRIPTION

Figure 1:
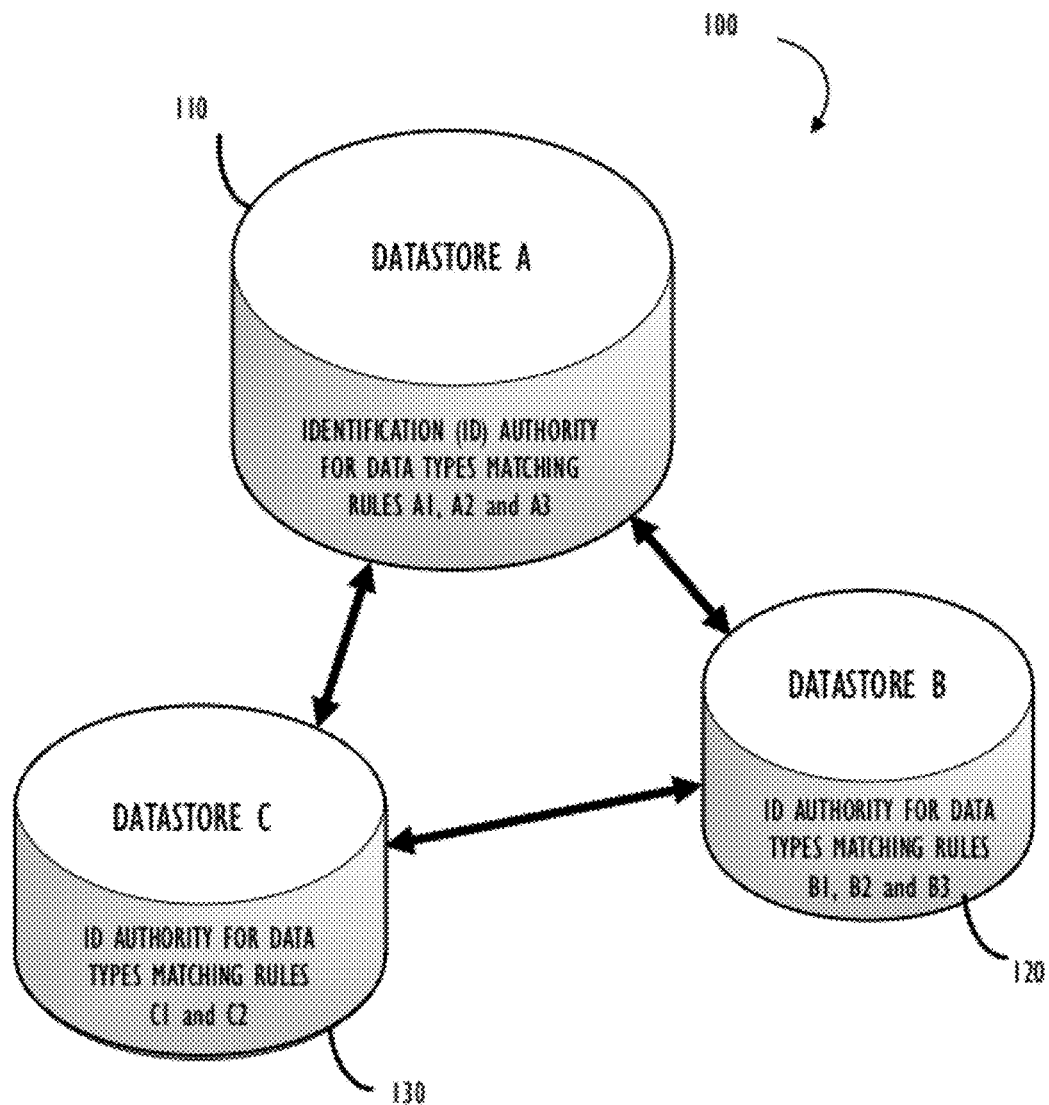
FIG. 1 illustrates, in block diagram form, an example of a plurality of datastores, with different identification authority, communicatively coupled to each other.

Today it is not uncommon for all configuration items (CIs) to be stored in a single centralized CMDB. However, it is also possible (and over time may become more likely) to have more than one CMDB present in a single customer environment. For example, in a cloud management product there could be two CMDBs. A first CMDB acting as the cloud data store (Cloud CMDB) and the other acting as the centralized enterprise CMDB (Enterprise CMDB). Because both of these CMDBs are in the same customer environment there is a need for coordinated identification of CIs within the customer environment. For ease of understanding, this disclosure is described in the context of two or three CMDB type datastores working together; however, it will be apparent to those of ordinary skill in the art having the benefit of this disclosure that any number of datastores, and not necessarily CMDB type datastores, could benefit from the concepts of this disclosure.

Evolving from a single monolithic CMDB to a truly distributed CMDB environment involves a number of challenges. One of the challenges is to make sure a given CI is defined with the same identity in all the CMDBs that interact with each other. For example, a CI such as a laptop with hostname XYZ could be present in more than one CMDB. Within a given CMDB each CI is assigned a unique identity and that identity is generally used by applications to interact with the CI. Thus, in a distributed CMDB there could exist a need to ensure any given CI (such as the laptop mentioned above) is given the same identity in each of the CMDB instances. Doing so could be beneficial for various computer system applications by increasing the application's ability to work seamlessly across any CMDB instance in a distributed CMDB scenario.

In the following description, for purposes of explanation, numerous specific details are set forth in order to provide a thorough understanding of the inventive concept. As part of this description, some structures and devices may be shown in block diagram form in order to avoid obscuring the invention. Moreover, the language used in this disclosure has been principally selected for readability and instructional purposes, and may not have been selected to delineate or circumscribe the inventive subject matter, reference to the claims being necessary to determine such inventive subject matter. Reference in the specification to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the information technology support system field having the benefit of this disclosure.

Referring now to FIG. 1, block diagram 100 illustrates a distributed datastore environment comprising three (3) datastores communicatively coupled to each other. The first datastore 110 is named "datastore A" and the second datastore 120 is named "datastore B" as used in the following example embodiments. The third datastore 130 "datastore C" represents another datastore to illustrate that identification authority can be divided in a variety of ways across any number of datastores in a distributed datastore environment. Also, each datastore (e.g., CMDB) may or may not have federated data repositories (not shown) on one or more computer systems throughout the enterprise.

Figure 2:
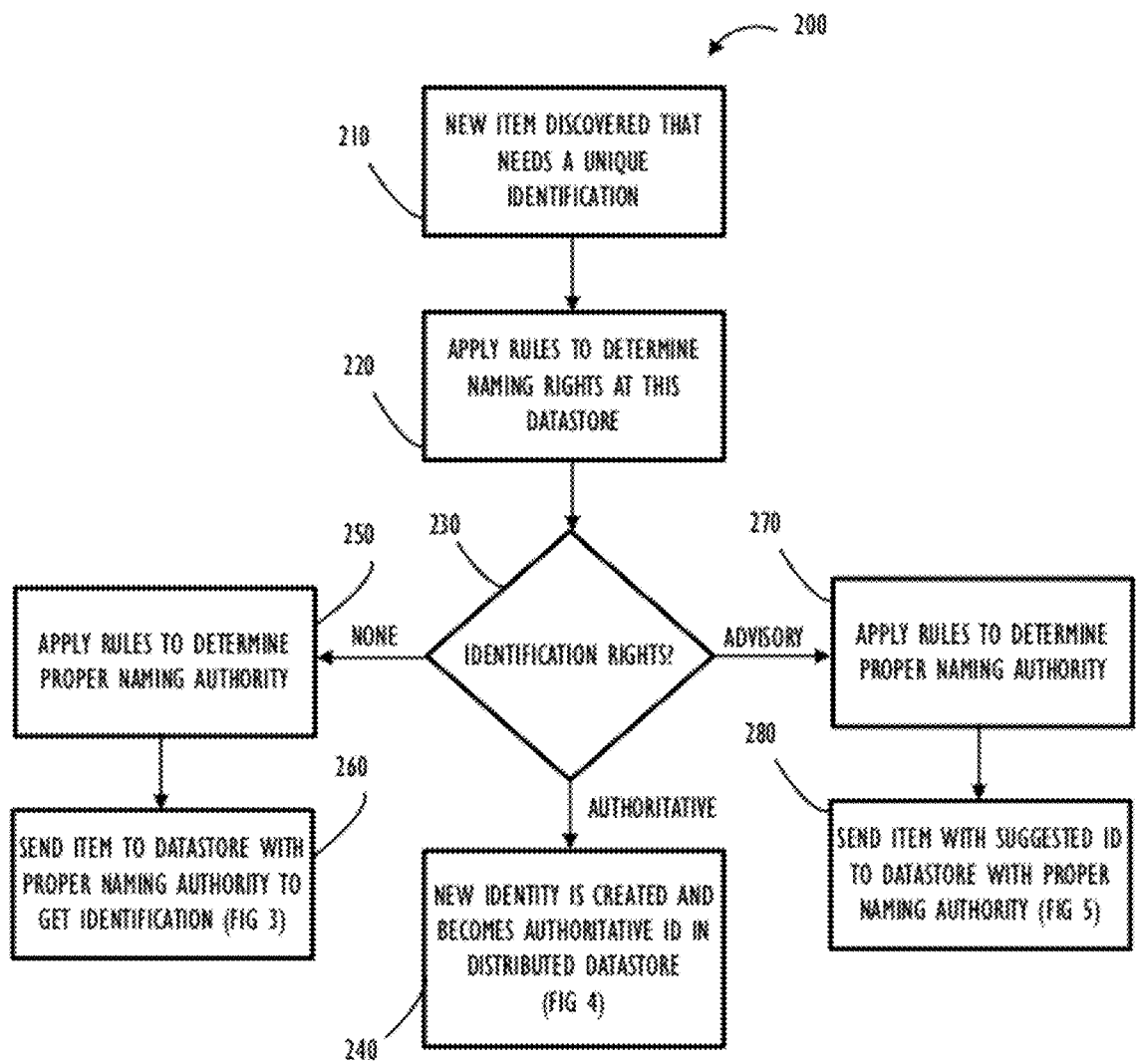
FIG. 2 illustrates a flow chart depicting application of logical rules to determine an identification authority for a new item (e.g., CI) according to at least one disclosed embodiment.

Referring now to FIG. 2, flow chart 200 describes three possible scenarios for creating a unique identifier for a new item (e.g., CI) in the context of a distributed datastore. The three possible scenarios described in this example include 1) no identification rights, 2) "advisory" identification rights (where a datastore can suggest a unique identifier but that suggestion must be accepted by an authority), and 3) authoritative (i.e., absolute) identification rights. Beginning at block 210 a new item is discovered (or defined by a datastore user) and appears for the first time at a datastore. The datastore can then apply rules to the item to determine if identification authority exists for the current datastore (block 220). As a result of applying these rules, it could be determined (block 230) if this datastore has: no identification rights for this type of item (proceed to block 250); advisory identification rights for this type of item (proceed to block 270); or authoritative identification rights for this type of item (proceed to block 240). If no identification authority exists (block 250) rules may optionally be applied again to determine which datastore has the authority and the item could be sent (block 260) to that authoritative datastore for identification (e.g., process 300 of FIG. 3). Alternatively, if advisory authority exists (block 270) rules could also be applied to determine authoritative datastore for identification and the item could be sent (block 280) to that authoritative datastore with a suggested identification for the item as described in process 500 of FIG. 5. Finally, if authoritative authority exists in this datastore (block 240) an identification process could be invoked and coordination with other datastores could proceed, either now or in the future, in a manner such as described in process 400 of FIG. 4.

Figure 3:
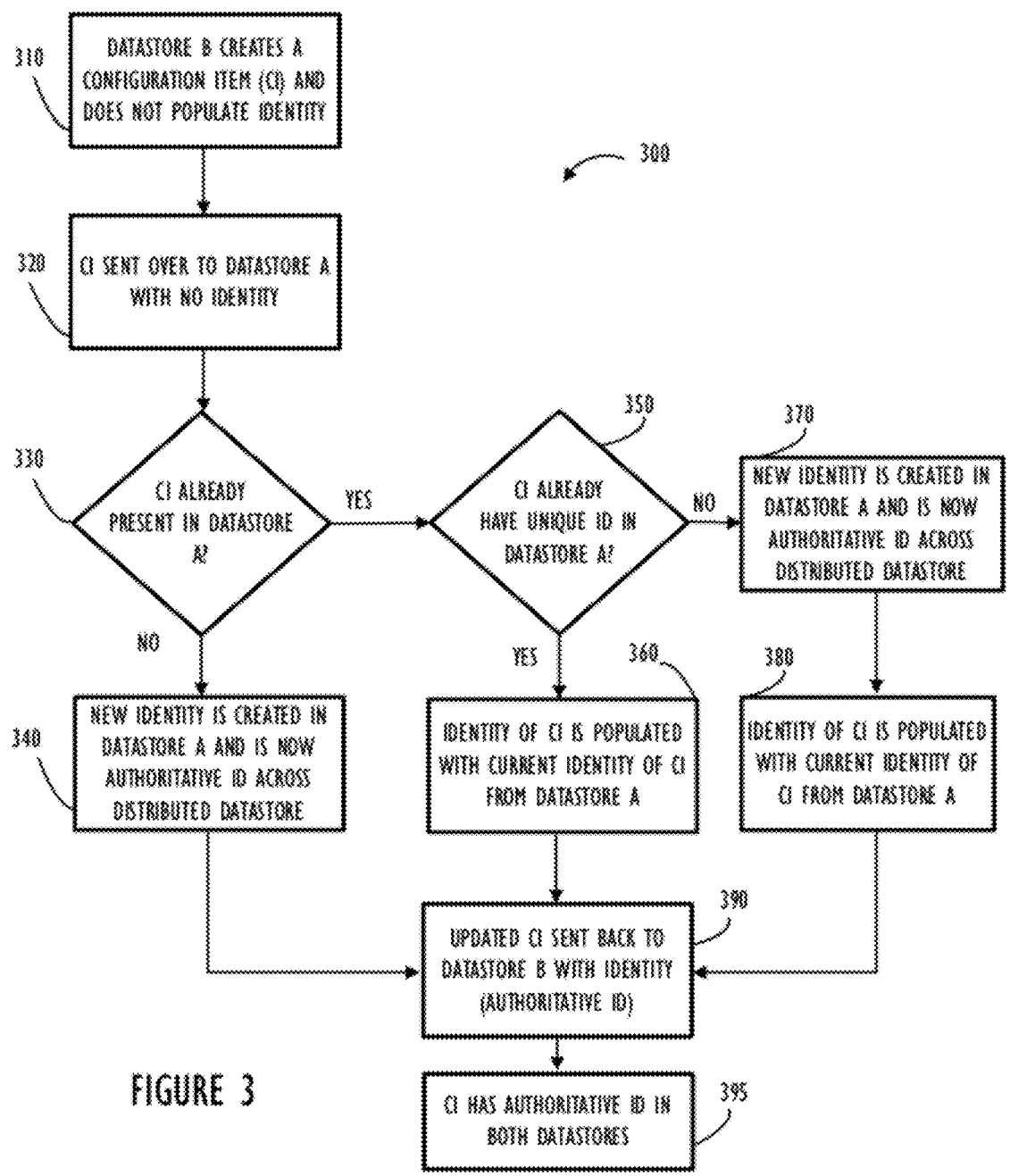
FIG. 3 illustrates a flow chart depicting an embodiment of an identification process for a newly discovered CI where only one datastore has identification rights of any kind (e.g., master and slave).

Referring now to FIG. 3, flow chart 300 describes one embodiment where a first datastore ("datastore B") has no identification rights whatsoever (i.e., it is a slave of another datastore ("datastore A") with authoritative identification rights). Beginning at block 310, datastore B discovers a new CI and because datastore B has no identification rights the identity is not yet populated. At block 320, information about the new CI is sent to datastore A. Next, at block 330 datastore A determines if this particular CI is already known to datastore A. If so, the YES prong of block 330, flow continues to block 350 to determine if this particular CI has already been assigned a unique identifier. If so, the YES prong of block 350, flow continues to block 360 where the identity of the CI can be populated with the already existing unique identifier. Alternatively, the NO prong of block 350, flow can continue to block 370 where a new identity is created in datastore A because, in this example, datastore A has authoritative identification rights. Next, at block 380, the identity of the CI can be populated with the authoritative, and now current, identity from datastore A. After all of blocks 340, 360 and 380, flow continues to block 390 where the updated CI (with an authoritative identity) is sent back to datastore B. At the end of this process both datastore A and datastore B are consistent in their use of the authoritative identity supplied by datastore A (block 395).

Figure 4:
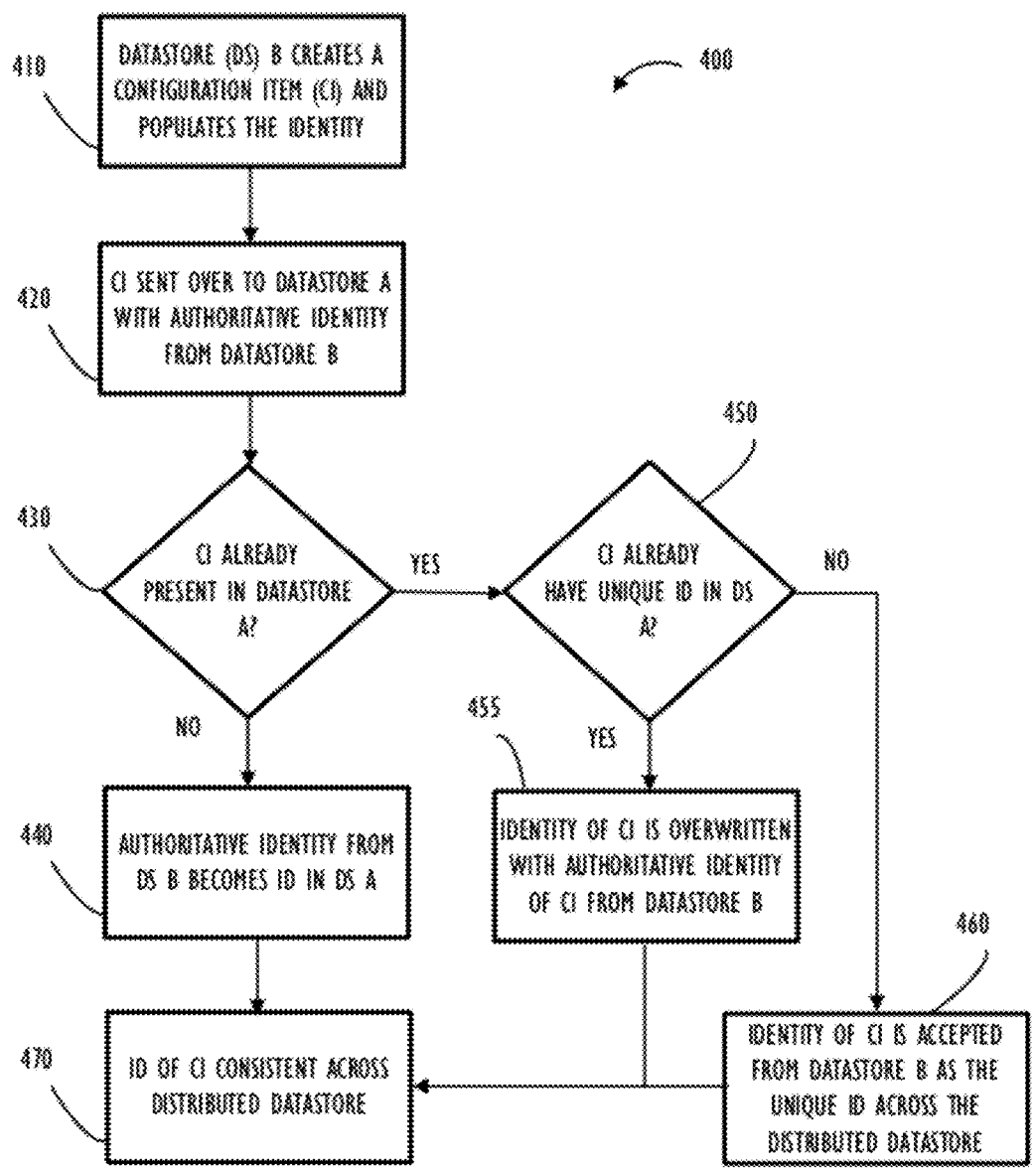
FIG. 4 illustrates a flow chart depicting an embodiment of an identification process for a newly discovered CI in datastore B (where datastore B is the authoritative identification entity) even though datastore A may have already had the same CI defined.

Referring now to FIG. 4, flow chart 400 describes another embodiment where datastore B has authoritative identification rights for any CI (i.e., datastore B is authoritative identification datastore relative to any other datastore). Beginning at block 410, datastore B discovers and creates a new CI. Block 410 also indicates that datastore B populates the identity of the new CI. Next, at block 420 the new CI is sent to datastore A with the authoritative identity already populated. At block 430, datastore A determines if the new CI is already defined in datastore A. If not, the NO prong of decision 430, flow continues to block 440 where datastore A accepts the CI and its authoritative identifier from datastore B. However, if the CI is already present in datastore A, the YES prong of decision 430, flow continues to decision 450 where it is determined if the CI already has a unique identification in datastore A. If so, the YES prong of decision 450, flow continues to block 455 where the identity of the CI in datastore A is overwritten because the previous unique identity was not (or is no longer) an authoritative identity. It should be recognized that when a unique identity is overwritten, all references to that unique identifier in a datastore should be updated. Also, other processes may need to be invoked to correct all other external references to the previous unique identifier throughout the enterprise. However, if a unique identity was not present for the CI, the NO prong of decision 450, flow continues to block 460 where the identity is accepted from datastore B in datastore A and other updates may be avoided. Finally, at block 470, all datastores have the identical authoritative identity for the CI.

In general, a case where two datastores already have defined unique identification that is not authoritative could happen. For example, when two or more datastores are already running in an environment prior to setting up a cooperative identification scheme for the distributed datastore environment. However, after the authoritative identity is defined it should remain persistent unless another authoritative identification scheme is established.

Figure 5:
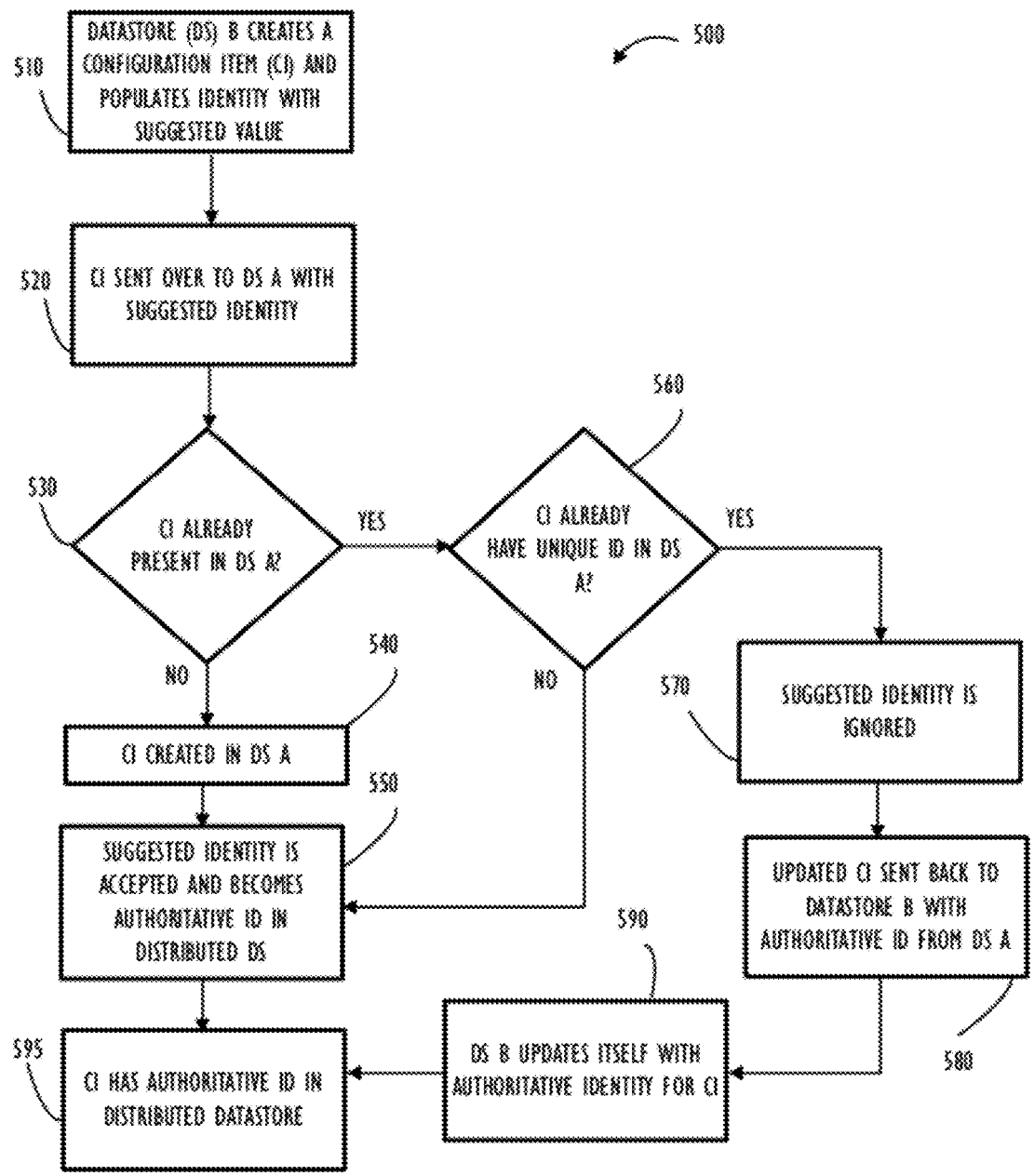
FIG. 5 illustrates a flow chart depicting an embodiment of an identification process for a newly discovered CI comprising an advisory identification entity (datastore B) working in conjunction with an authoritative identification entity (datastore A).

Referring now to FIG. 5, flow chart 500 describes another embodiment where datastore B has advisory identification rights for a particular CI (i.e., datastore B is advisory for a certain grouping of CIs and datastore A has authoritative identification rights for the same group of CIs). Beginning at block 510, datastore B creates a CI and populates its identity with suggested values. At block 520, the new CI is sent to datastore A with a suggested unique identifier. At block 530, it is determined if this CI is already present in datastore A. If not, the NO prong of decision 530, flow continues to block 540 where a CI is created in datastore A. If so, the YES prong of decision 530, it is determined (at decision 560) if the CI already has a unique identifier defined in datastore A. If the CI does not already have a unique identifier, either because it was not previously defined (NO prong of decision 530) or because it was defined but did not already have a unique identifier (NO prong of decision 560), flow continues to block 550 where the suggested identifier from datastore B could be accepted and become the authoritative unique identification for the CI (block 595). Alternatively, if the CI is defined and does have a unique identifier already (the YES prong of decision 560), flow continues to block 570 where the suggested identifier is ignored and to block 580 where an updated CI is sent back to datastore B so that datastore B can update itself with the correct authoritative identification for the CI (block 590). Finally, all datastores have knowledge of the authoritative identifier from datastore A's perspective and are consistent (block 595).

As explained here, certain datastores, such as CMDBs, can share the responsibility for performing unique identification for CIs that are new to them. CIs can be new to a CMDB because they are automatically discovered or manually defined by a system administrator (or a combination of both). New CIs should be named consistently across the enterprise to facilitate IT support applications like those used in Business Service Management (BSM). Also, responsibility may be divided amongst the different CIs using a number of techniques. For example, a CMDB may have identification rights for a certain class of CIs, such as all computers. Alternatively, the CMDB could have identification rights for all laptop computers whose hostname begins in the range [a-g]. Basically, any defined set of rules regarding which CMDBs have authoritative, advisory, or no identification responsibility could be used. Different implementation strategies may be better for different types of distributed CMDB environments. In one embodiment, these rules will designate one and only one CMDB to match with authoritative identification rights for applicable CIs when they are discovered.

Figure 6:
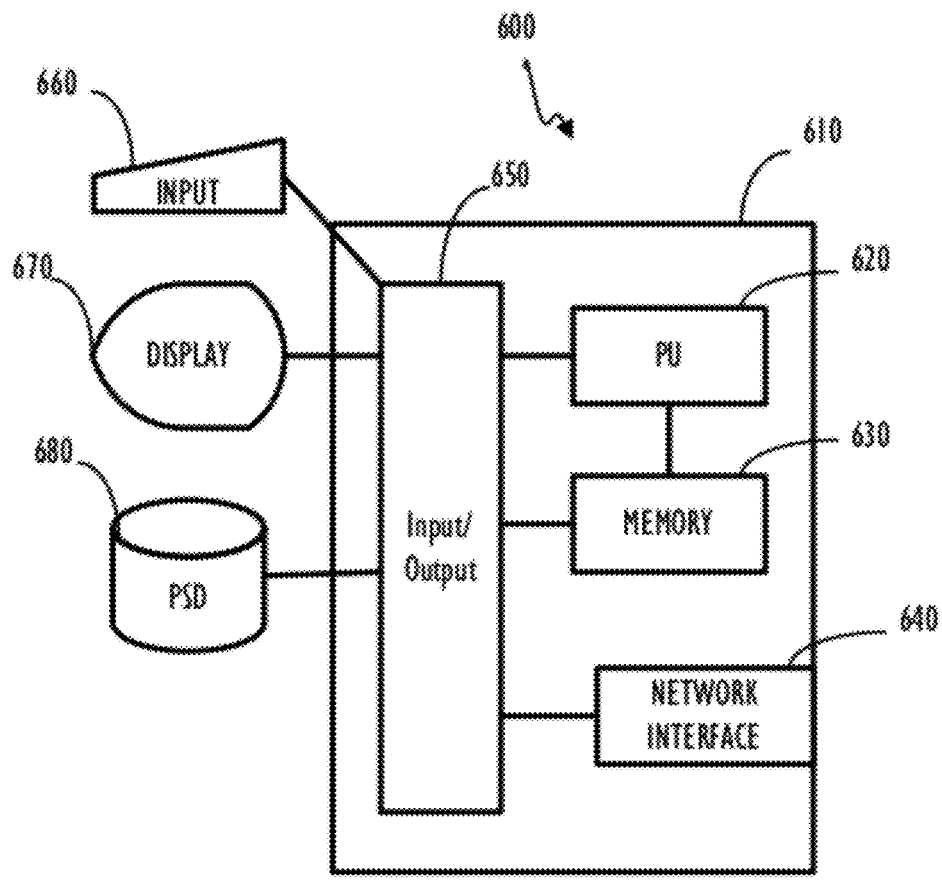
FIG. 6 illustrates, in block diagram form, an example computing device comprising a program control device.

Referring now to FIG. 6, example computing device 600 is shown. One or more example computing devices 600 may be included in a mainframe or distributed computer (neither shown). Example computing device 600 comprises a programmable control device 610 which may be optionally connected to input devices 660 (e.g., keyboard, mouse, touch screen, etc.), display 670 and/or program storage device (PSD) 680 (sometimes referred to as a direct access storage device DASD). Also, included with program control device 610 is network interface 640 for communication via a network with other computing and corporate infrastructure devices (not shown). Note, network interface 640 may be included within programmable control device 610 or be external to programmable control device 610. In either case, programmable control device 610 may be communicatively coupled to network interface 640. Also note, program storage device 680 represents any form of non-volatile storage including, but not limited to, all forms of optical and magnetic storage elements including solid-state storage.

Program control device 610 may be included in a computing device and be programmed to perform methods in accordance with this disclosure. Program control device 610 may itself comprise processor unit (PU) 620, input-output (I/O) interface 650 and memory 630. Processing unit 620 may include any programmable control device including, for example, processors of an IBM mainframe (such as a quad-core z10 mainframe microprocessor). Alternatively, in non-mainframe systems examples of processing unit 620 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 630 may include one or more memory modules and comprise random access memory (RAM), read only memory (ROM), programmable read only memory (PROM), programmable read-write memory, and solid state memory. One of ordinary skill in the art will also recognize that PU 620 may also include some internal memory including, for example, cache memory.

Aspects of the embodiments are described as a method of control or manipulation of data, and may be implemented in one or a combination of hardware, firmware, and software. Embodiments may also be implemented as instructions stored on a machine-readable medium, which may be read and executed by at least one processor to perform the operations described herein. A machine-readable medium may include any mechanism for tangibly embodying information in a form readable by a machine (e.g., a computer). For example, a machine-readable medium (sometimes referred to as a program storage device or a computer readable medium) may include read-only memory (ROM), random-access memory (RAM), magnetic disc storage media, optical storage media, flash-memory devices, electrical, optical, and others.

In the above detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim.

Various changes in the details of the illustrated operational methods are possible without departing from the scope of the following claims. For instance, illustrative flow chart steps or process steps of FIGS. 2-5 may be performed in an order different from that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 2-5 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs").

It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for improving distributed configuration management databases (CMDBs) that include a plurality of communicatively-coupled datastores, the method comprising:
    establishing an authoritative and absolute identification of a configuration item (CI), the authoritative and absolute identification being an identification that is persistent in the distributed CMDBs irrespective of any configuration status of the CI, the establishing by:
    receiving, for a first time at a first communicatively-coupled datastore, an indication of a presence of the CI on a network, the CI not having a recognizable unique identifier across the distributed CMDBs, the first communicatively-coupled datastore having no advisory or authoritative and absolute identification rights for the CI;
    applying rules to the indication received at the first communicatively-coupled datastore to select a second communicatively-coupled datastore, the second communicatively-coupled datastore having authoritative and absolute identification rights for the CI,
    sending information regarding the CI from the first communicatively-coupled datastore to the second communicatively-coupled datastore;
    determining, by the second datastore, an identifier for the CI as being the recognizable unique identifier of the CI across the distributed CMDBs and being the persistent, authoritative and absolute identification of the CI in the distributed CMDBs irrespective of any configuration status of the configuration item;
    receiving, at the first communicatively-coupled datastore the unique identifier for the CI as determined by the second communicatively-coupled datastore; and
    populating the first communicatively-coupled datastore with the unique identifier as the persistent, authoritative and absolute identification of the CI in the distributed CMDBs irrespective of any configuration status of the CI.

2. The method of claim 1, wherein the first communicatively-coupled datastore and the second communicatively-coupled datastore comprise a CMDB.

3. The method of claim 1, wherein the act of applying rules to the indication received at the first communicatively-coupled datastore comprises applying rules for selecting the second communicatively-coupled datastore based on a class of the CI.

4. The method of claim 3, wherein the act of applying rules to the indication received at the first communicatively-coupled datastore further comprises applying rules for selecting the second communicatively-coupled datastore based on a subclass of the class of the CI.

5. The method of claim 1, wherein the act of applying rules to the indication received at the first communicatively-coupled datastore comprises applying rules for selecting the second communicatively-coupled datastore based on logical, physical, or geographical location of the CI.

6. The method of claim 1, wherein the act of applying rules to the indication received at the first communicatively-coupled datastore comprises applying rules for selecting the second communicatively-coupled datastore based on an attribute of a class of the CI.

7. A computer network linking distributed configuration management databases (CMDBs) that include a plurality of communicatively-coupled datastores, the computer network comprising:
    a plurality of processing units; and
    at least one memory storing instructions that, when executed by at least one of the plurality of processing units, causes the computer network to:
    establish an authoritative and absolute identification of a configuration item (CI), the authoritative and absolute identification being an identification that is persistent in the distributed CMDBs irrespective of any configuration status of the CI, by:
    receiving for a first time an indication of the CI at a first communicatively-coupled datastore, the CI not having a recognizable unique identifier across the distributed CMDBs, the first communicatively-coupled datastore having no advisory or authoritative and absolute identification rights for the CI;
    applying rules to the indication received at the first communicatively-coupled datastore to select a second communicatively-coupled datastore, the second datastore having authoritative and absolute identification rights for the CI as determined by the applied rules;
    sending information regarding the CI from the first communicatively-coupled datastore to the second communicatively-coupled datastore;
    determining, by the second communicatively-coupled datastore, an identifier for the CI as being the recognizable unique identifier of the CI across the distributed CMDBs and being the persistent, authoritative and absolute identification of the CI in the distributed CMDBs irrespective of any configuration status of the CI;
    receiving, at the first communicatively-coupled datastore the unique identifier for the CI as determined by the second communicatively-coupled datastore; and
    populating the first communicatively-coupled datastore with the unique identifier as the persistent, authoritative and absolute identification of the CI in the distributed CMDBs irrespective of any configuration status of the CI.

8. The computer network of claim 7, wherein the first communicatively-coupled datastore and the second communicatively-coupled datastore comprise a CMDB.

9. The computer network of claim 7, wherein the act of applying rules to the indication received at the first communicatively-coupled datastore comprises applying rules for selecting the second communicatively-coupled datastore based on a class of the CI.

10. The computer network of claim 9, wherein the act of applying rules to the indication received at the first communicatively-coupled datastore further comprises applying rules for selecting the second communicatively-coupled datastore based on a subclass of the class of the CI.

11. The computer network of claim 7, wherein the act of applying rules to the indication received at the first communicatively-coupled datastore comprises applying rules for selecting the second communicatively-coupled datastore based on logical, physical, or geographical location of the CI.

12. The computer network of claim 7, wherein the act of applying rules to the indication received at the first communicatively-coupled datastore comprises applying rules for selecting the second communicatively-coupled datastore based on an attribute of a class of the CI.

* * * * *